(12) United States Patent
Li et al.

(10) Patent No.: US 9,491,074 B2
(45) Date of Patent: Nov. 8, 2016

(54) METHOD, APPARATUS, AND SYSTEM FOR DETECTING CONNECTIVITY

(71) Applicant: Huawei Technologies Co., Ltd., Shenzhen, Guangdong (CN)

(72) Inventors: Yizhou Li, Nanjing (CN); Weiguo Hao, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 109 days.

(21) Appl. No.: 14/534,461

(22) Filed: Nov. 6, 2014

(65) Prior Publication Data

US 2015/0063094 A1 Mar. 5, 2015

Related U.S. Application Data

(63) Continuation of application No. PCT/CN2012/083910, filed on Nov. 1, 2012.

(30) Foreign Application Priority Data

May 25, 2012 (CN) .......................... 2012 1 0165624

(51) Int. Cl.
| | |
|---|---|
| *H04L 12/26* | (2006.01) |
| *H04L 12/733* | (2013.01) |
| *H04L 12/18* | (2006.01) |
| *H04L 12/707* | (2013.01) |
| *H04L 12/703* | (2013.01) |

(52) U.S. Cl.
CPC ....... *H04L 43/0811* (2013.01); *H04L 12/1863* (2013.01); *H04L 45/20* (2013.01); *H04L 45/22* (2013.01); *H04L 45/28* (2013.01)

(58) Field of Classification Search
None
See application file for complete search history.

(56) References Cited

U.S. PATENT DOCUMENTS

| | | | |
|---|---|---|---|
| 2008/0112331 A1 | 5/2008 | Long et al. | |
| 2010/0082807 A1 | 4/2010 | Wang | |
| 2011/0299406 A1* | 12/2011 | Vobbilisetty | H04L 43/10 370/248 |
| 2012/0014261 A1* | 1/2012 | Salam | H04L 43/0811 370/242 |
| 2012/0044944 A1* | 2/2012 | Kotha | H04L 41/12 370/401 |
| 2012/0106339 A1* | 5/2012 | Mishra | H04L 43/106 370/235 |
| 2012/0163164 A1* | 6/2012 | Terry | H04L 45/24 370/221 |

FOREIGN PATENT DOCUMENTS

| | | |
|---|---|---|
| CN | 101179479 A | 5/2008 |
| CN | 101369922 A | 2/2009 |
| CN | 101420385 A | 4/2009 |
| CN | 102118773 A | 7/2011 |

OTHER PUBLICATIONS

Donald Eastlake, et al., "RBridges: OAM and BFD Support for TRILL", TRILL Working Group, Oct. 17, 2010, 23 pages.
Y. Li, et al., "OAM tool for RBridges: Multi-destination Ping", TRILL Working Group, May 4, 2012, 14 pages.
* cited by examiner

*Primary Examiner* — Gary Mui

(57) ABSTRACT

The present invention discloses a method, an apparatus, and a system for detecting connectivity. A node receives connectivity detection request information; determines, according to nicknames of target nodes, whether the is one of the target nodes; if the node is one of the target nodes, sends connectivity detection reply information to a source node; if the node is not one of the target nodes, performs corresponding processing according to a value of a hop count and whether the node is on a path that is in the multicast distribution tree and is from the source node to any one of the target nodes. With the present invention, a source node is capable of receiving only a feedback of a node on a true path, thereby making it easier to identify a path.

18 Claims, 8 Drawing Sheets

METHOD, APPARATUS, AND SYSTEM FOR DETECTING CONNECTIVITY

CROSS REFERENCE TO RELATED APPLICATIONS

This application is a continuation of International Application No. PCT/CN2012/083910, filed on Nov. 1, 2012, which claims priority to Chinese Patent Application No. 201210165624.X, filed on May 25, 2012, both of which are incorporated herein by reference in their entireties.

TECHNICAL FIELD

The present invention relates to the field of communications technologies, and in particular, to a method, an apparatus, and a system for detecting connectivity.

BACKGROUND

The Transparent Interconnection of Lots of Links (TRILL) Protocol is usually implemented by devices called routing bridges or Rbridges. The TRILL technology runs at a data link layer (Layer 2), and mainly integrates advantages of a bridge and a router, that is, a link state routing technology is used at the data link layer, and does not interfere with operation of an upper-layer router.

Generally, a packet header of a TRILL packet is shown in FIG. 1, where an egress routing bridge nickname is used to store a nickname of a target routing bridge during unicasting and is used to store a multicast distribution tree nickname during multicasting; an ingress routing bridge nickname is used to store a nickname of a source routing bridge; and a hop count is the number of times that the TRILL packet may be forwarded to a next hop during a propagation process.

Operation, administration and maintenance (OAM) generally includes connectivity detection, error isolation, and fault diagnosis between two nodes, while OAM using the TRILL technology has become a main means to perform connectivity detection, error isolation, and fault diagnosis between two nodes.

In the prior art, currently when OAM of the TRILL tests a multicast path by using a traceroute command, only an entire multicast distribution tree can be tested. As shown in FIG. 2, FIG. 2 is a schematic diagram of testing a multicast path by using traceroute in the prior art. Ovals numbered 1, 2, 3, 4, 5, 6, and 7 in FIG. 2 represent a routing bridge RB1, a routing bridge RB2, a routing bridge RB3, a routing bridge RB4, a routing bridge RB5, a routing bridge RB6, and a routing bridge RB7 respectively. If a multicast distribution tree tree1 using the routing bridge RB2 as a root is established in an entire topology, and for the multicast distribution tree tree1, reference may be made to bold lines in FIG. 2, traceroute may be performed on the tree1 on the source node routing bridge RB1. A specific traceroute process is as follows: The routing bridge RB1 sends a multicast packet of which an ingress routing bridge nickname is RB1 and an egress routing bridge nickname is tree1; the multicast packet includes connectivity detection request information (which may be an echo request message); therefore, the connectivity detection request information is multicast with the packet on a network formed by the routing bridges. When sending the multicast packet, the routing bridge RB1 first sets a hop count in the connectivity detection request information to 1, and increases the hop count gradually each time the routing bridge RB1 sends the connectivity detection request information until the hop count reaches a maximum value.

Generally, the connectivity detection request information may be carried in an OAM packet for forwarding. For a packet header of the OAM packet here, reference may be made to FIG. 1. So long as the value of the hop count is large enough, the connectivity detection request information is copied and forwarded as shown by arrows in FIG. 2 with the multicast packet along the tree1. For example, the routing bridge RB1 first forwards the connectivity detection request information to the routing bridge RB7 and the routing bridge RB5 in the distribution tree tree1; after receiving the packet, the routing bridge RB7 and the routing bridge RB5 deducts the hop count in the received connectivity detection request information by 1, and the hop count becomes 0. Because the routing bridge RB7 is a leaf node, the routing bridge RB7 sends connectivity detection reply information (which may be an echo reply message) to the routing bridge RB1, while the routing bridge RB5 sends unreachable information (which may be an error message) to the routing bridge RB1, and stops further forwarding. After receiving the unreachable information returned by the routing bridge RB5, the routing bridge RB1 adds 1 to the hop count, and continues to send a connectivity detection request information of which a hop count is 2 to the routing bridge RB7 and the routing bridge RB5 through multicasting; after receiving the multicast packet, the routing bridge RB5 deducts the hop count by 1, and the hop count becomes 1, and then the routing bridge RB5 continues to forward the multicast packet to the routing bridge RB2 along the tree1; after receiving the multicast packet, the routing bridge RB2 deducts the hop count by 1, and the hop count becomes 0, and then the routing bridge RB2 sends unreachable information to the routing bridge RB1. The rest is deduced by analogy. Each time the routing bridge RB1 receives latest unreachable information, it increases the hop count until the hop count reaches a maximum value. As the hop count increases, the routing bridge RB1 obtains unreachable information sent by nodes which are one hop, two hops, three hops . . . n hops away from the routing bridge RB1 in sequence, and the unreachable information carries information about the nodes that send the unreachable information. In addition, during the foregoing multicast process, the RB1 receives connectivity detection reply information sent by the RB7, the RB3, and the RB4 respectively. In this way, the RB1 may depict a structure of the entire tree according to the received unreachable information.

The prior art has at least the following problems: when performing traceroute on a multicast path, current OAM of the TRILL can only trace all nodes in an entire multicast distribution tree, and cannot perform connectivity check on a designated node in the multicast distribution tree, with low pertinence and low efficiency; and a source node receives unreachable information from all the nodes in the entire multicast distribution tree, which makes it relatively difficult for the source node to identify a path.

SUMMARY

To implement connectivity check on one or more designated target nodes and enable a source node to identify a path more easily, embodiments of the present invention provide a method, an apparatus, and a system for detecting connectivity. The technical solutions are as follows:

A method for detecting connectivity includes:

receiving connectivity detection request information, where the connectivity detection request information comprises a nickname of a source node, a nickname of a multicast distribution tree, nicknames of target nodes, and a hop count;

determining, according to the nicknames of the target nodes, whether a node that receives the connectivity detection request information is one of the target nodes;

if the node is one of the target nodes, sending connectivity detection reply information to the source node; and if the node is not one of the target nodes, performing corresponding processing according to a value of the hop count and whether the node is on a path that is in the multicast distribution tree and is from the source node to any one of the target nodes.

An apparatus for detecting connectivity includes:

a receiver, configured to receive connectivity detection request information, where the connectivity detection request information comprises a nickname of a source node, a nickname of a multicast distribution tree, nicknames of target nodes, and a hop count;

a determining module, configured to determine, according to the nicknames of the target nodes, whether a node that receives the connectivity detection request information is one of the target nodes;

a returning module, configured to: when the determining module determines that the node is one of the target nodes, send connectivity detection reply information to the source node; and a processing module, configured to: when the determining module determines that the node is not one of the target nodes, perform corresponding processing according to a value of the hop count and whether the node is on a path that is in the multicast distribution tree and is from the source node to any one of the target nodes.

A system for detecting connectivity includes the foregoing apparatus for detecting connectivity.

The technical solutions provided by the embodiments of the present invention bring about the following beneficial effects:

Connectivity detection request information comprising a plurality of designated target nodes is sent by a source node, so that all the designated target nodes in a multicast distribution tree send connectivity detection reply information to the source node, while all non-target nodes that are in the multicast distribution tree and on a designated path from the source node to a target node send unreachable information to the source node. In this way, connectivity detection and fault diagnosis can be performed on the plurality of designated target nodes, and the source node is capable of receiving only information sent by a node on a true path, thereby making it easier to identify a path.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the embodiments of the present invention in detail with reference to the accompanying drawings. "Several" in this specification includes one or more.

Figure 3A:
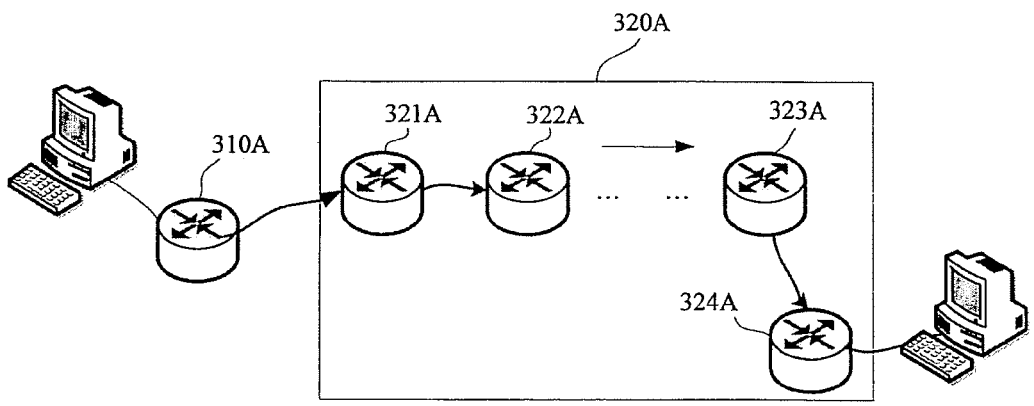
FIG. 3A is a schematic diagram of an implementation environment of a method for detecting connectivity according to an embodiment of the present invention.

Referring to FIG. 3A, FIG. 3A shows a schematic diagram of an implementation environment of a method for detecting connectivity according to an embodiment of the present invention. The implementation environment includes a source node routing bridge 310A and several non-source node routing bridges 320A, and connectivity detection request information may be sent by the source node routing bridge 310A to one or some of the non-source node routing bridges 320A according to a rule, and may be forwarded between the non-source node routing bridges 320A according to a predetermined rule.

The source node routing bridge 310A may serve as a start node of a designated path in a designated multicast distribution tree during multicasting of the connectivity detection request information, and the source node routing bridge 310A may send the connectivity detection request information to a routing bridge on another node.

The non-source node routing bridges 320A may serve as routing bridges that receive and/or forward the connectivity detection request information during the multicasting of the connectivity detection request information. During the multicasting, the designated path in the multicast distribution tree generally includes a plurality of non-source node routing bridges 320A that is connected in sequence. As shown in FIG. 3A, the source node routing bridge 310A, a non-source node routing bridge 321A, a non-source node routing bridge 322A . . . a non-source node routing bridge 323A, and a non-source node routing bridge 324A are connected in sequence to form the designated path in the designated multicast distribution tree; a multicast packet (that is, an OAM packet including the connectivity detection request information) sent by the source node routing bridge 310A is multicast along the designated path, and the source node routing bridge 310A may designate, in the connectivity detection request information of the multicast packet, one or more of the non-source node routing bridge 321A, the non-source node routing bridge 322A . . . the non-source node routing bridge 323A, and the non-source node routing bridge 324A as one or more target node routing bridges.

Figure 3B:
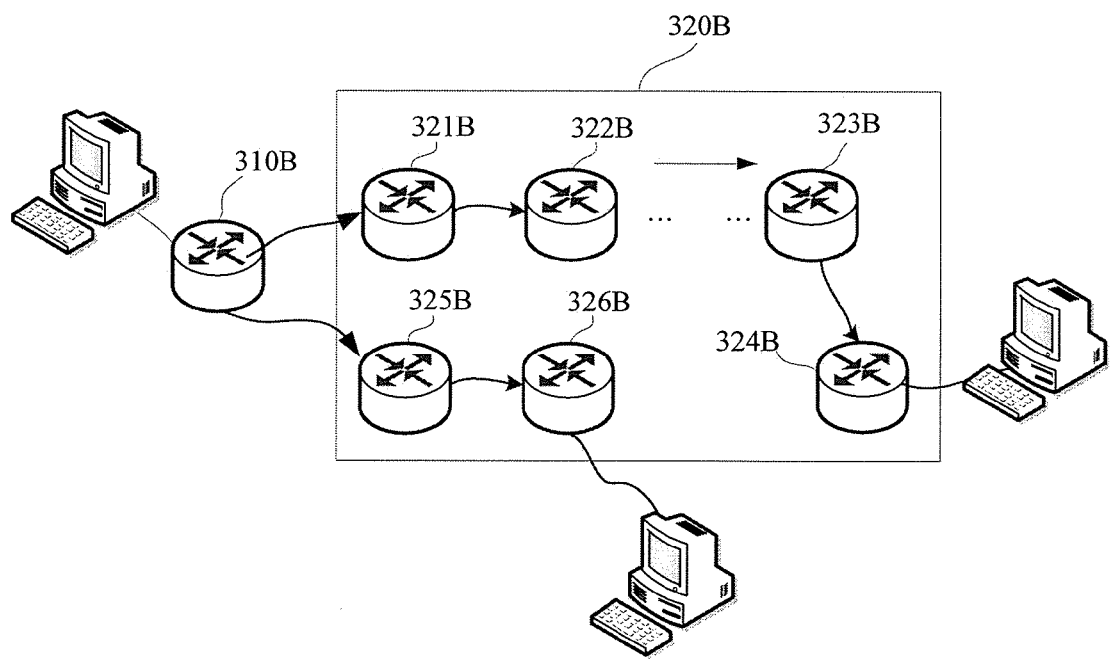
FIG. 3B is a schematic diagram of another implementation environment of a method for detecting connectivity according to an embodiment of the present invention.

Referring to FIG. 3B, FIG. 3B shows a schematic diagram of another implementation environment of a method for detecting connectivity according to an embodiment of the present invention. The implementation environment includes a source node routing bridge 310B and several non-source node routing bridges 320B, and connectivity detection request information may be sent by the source node routing bridge 310B to one or some of the non-source node routing bridges 320B according to a rule, and may be forwarded between the non-source node routing bridges 320B according to a predetermined rule.

The source node routing bridge 310B may serve as a start node of a designated path in a designated multicast distribution tree during multicasting of the connectivity detection request information, and the source node routing bridge 310B may send the connectivity detection request information to a routing bridge on another node.

The non-source node routing bridges 320B may serve as routing bridges that receive and/or forward the connectivity detection request information during the multicasting of the connectivity detection request information. During the multicasting, the designated path in the multicast distribution tree generally includes a plurality of non-source node routing bridges 320B that is connected in sequence. As shown in FIG. 3B, the designated path may include a non-source node routing bridge 321B, a non-source node routing bridge 322B . . . a non-source node routing bridge 323B, and a non-source node routing bridge 324B that are connected in sequence, where the first non-source node routing bridge 321B is connected to the source node routing bridge 310B. A multicast packet (that is, an OAM packet including the connectivity detection request information) sent by the source node routing bridge 310B is multicast along the designated path, and the source node routing bridge 310B may designate, in the connectivity detection request information of the multicast packet, one or more of the non-source node routing bridge 321*b*, the non-source node routing bridge 322B . . . the non-source node routing bridge 323B, and the non-source node routing bridge 324B as one or more target node routing bridges. In addition, in this environment, there may be some non-source node routing bridges, for example, a non-source node routing bridge 325B and a non-source routing bridge 326B, which are in the designated multicast distribution tree but are not on the designated path to a designated target node.

Embodiment 1

Figure 4:
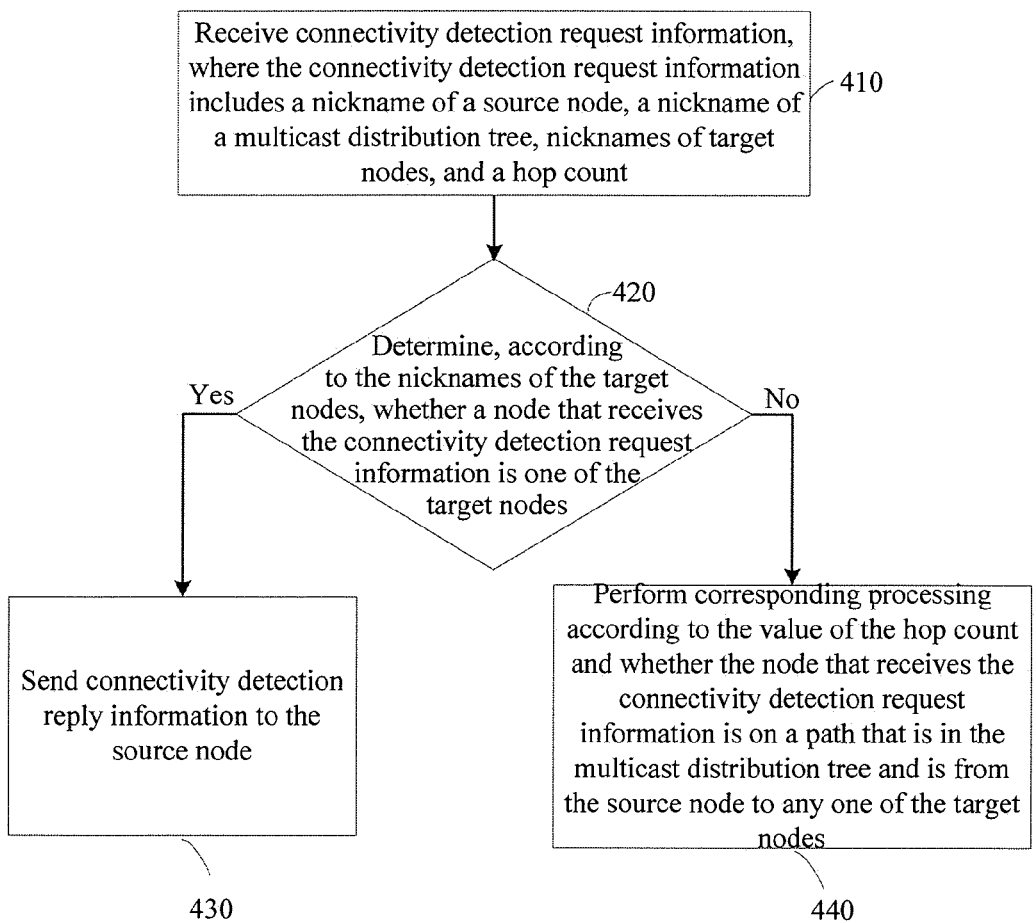
FIG. 4 is a flowchart of a method for detecting connectivity according to Embodiment 1 of the present invention.

FIG. 4 is a flowchart of a method for detecting connectivity according to Embodiment 1 of the present invention. The method for detecting connectivity may be performed on the non-source node routing bridge 320A in FIG. 3A, for example, the method may be performed by any one of the non-source node routing bridge 321A, the non-source node routing bridge 322A . . . the non-source node routing bridge 323A, and the non-source node routing bridge 324A. Assuredly, the method for detecting connectivity may also be performed on the non-source node routing bridge 320B in FIG. 3B, for example, the method may be performed by any one of the non-source node routing bridge 321B, the non-source node routing bridge 322B . . . the non-source node routing bridge 323B, and the non-source node routing bridge 324B. The method for detecting connectivity includes:

Step 410: Receive connectivity detection request information, where the connectivity detection request information includes a nickname of a source node, a nickname of a multicast distribution tree, nicknames of target nodes, and a hop count.

There may be one or more nicknames of the target nodes.

Step 420: Determine, according to the nicknames of the target nodes, whether a node that receives the connectivity detection request information is one of the target nodes.

Step 430: If the node that receives the connectivity detection request information is one of the target nodes, send connectivity detection reply information to the source node.

If the node that receives the connectivity detection request information determines that it is one of designated target nodes according to the nicknames of the target nodes in the received connectivity detection request information, the node sends connectivity detection reply information to a corresponding source node according to the nickname of the source node designated in the connectivity detection request information.

Step 440: If the node that receives the connectivity detection request information is not one of the target nodes, perform corresponding processing according to a value of the hop count and whether the node that receives the connectivity detection request information is on a path that is in the multicast distribution tree and is from the source node to any one of the target nodes.

If the node that receives the connectivity detection request information determines that it is not one of the designated target nodes according to the nicknames of the target nodes in the received connectivity detection request information, the node performs corresponding processing according to a value of the hop count in the connectivity detection request information and whether the node is on a path that is in the multicast distribution tree and is from the source node to any one of the target nodes.

In conclusion, by using the method for detecting connectivity provided by Embodiment 1 of the present invention, a plurality of designated target nodes in a multicast distribution tree can send connectivity detection reply information to a source node, so that connectivity detection and fault diagnosis can be performed on the plurality of designated target nodes.

During an actual application, the node that receives the connectivity detection request information may first determine whether it is one of the target nodes, and may also forward the connectivity detection request information according to the hop count. Therefore, two different cases may occur in an application of the method for detecting connectivity, for example, in the following Embodiment 2, after the node that receives the connectivity detection request information first determines whether it is one of the target nodes, the node forwards the connectivity detection request information according to the hop count, while in the following Embodiment 5, the node that receives the connectivity detection request information first forwards the connectivity detection request information through common multicasting according to the hop count, and then determines whether the node itself is one of the target nodes.

Embodiment 2

Figure 5:
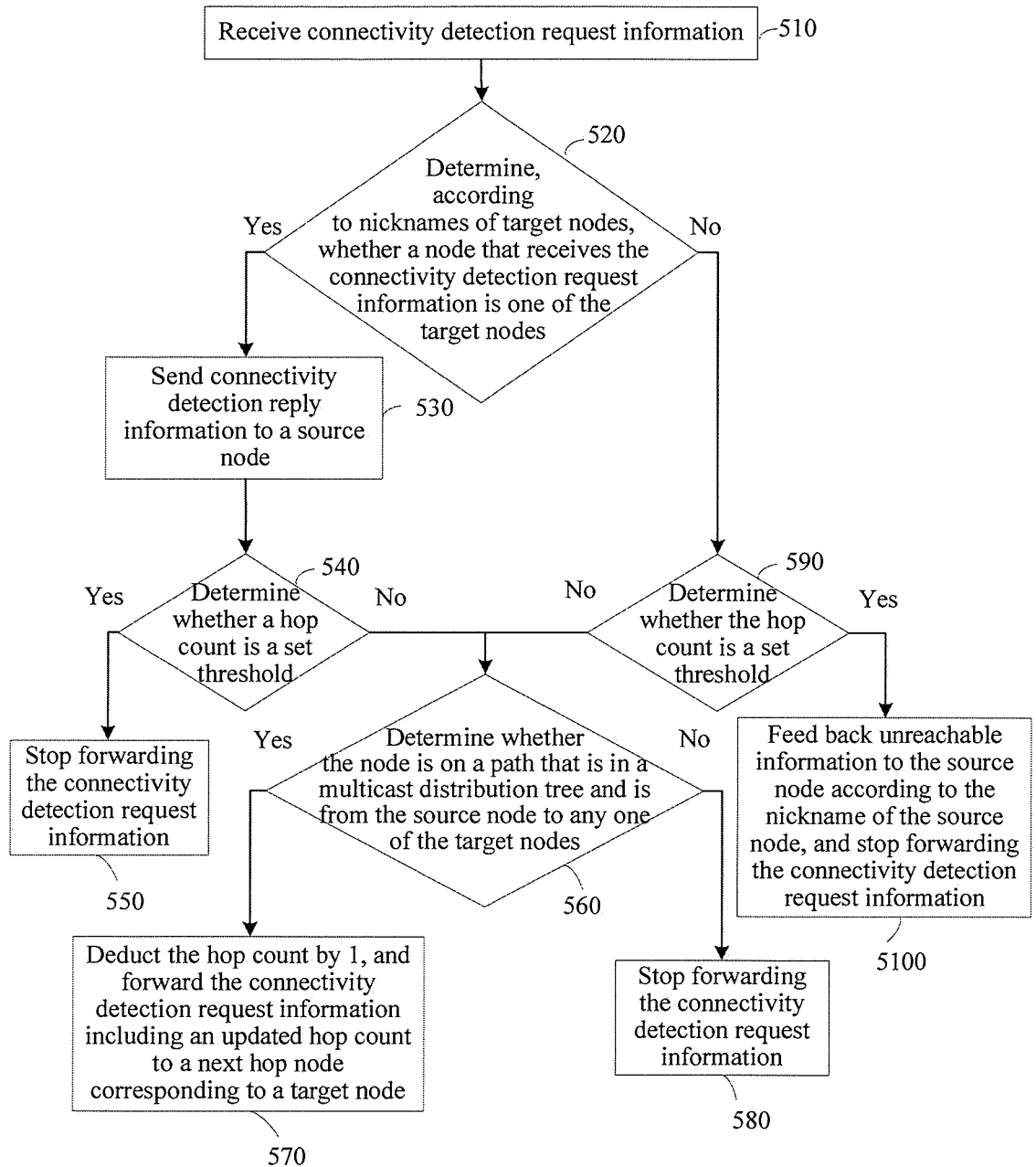
FIG. 5 is a flowchart of a method for detecting connectivity according to Embodiment 2 of the present invention.

FIG. 5 is a flowchart of a method for detecting connectivity according to Embodiment 2 of the present invention. The method for detecting connectivity is performed on the non-source node routing bridge 320A in FIG. 3A, for example, the connectivity detection request information may be processed by any one of the non-source node routing bridge 321A, the non-source node routing bridge 322A . . . the non-source node routing bridge 323A, and the non-source node routing bridge 324A. The method for detecting connectivity includes:

Step 510: Receive connectivity detection request information.

The connectivity detection request information includes a nickname of a source node, a multicast distribution tree nickname, nicknames of target nodes, and a hop count.

Generally, the connectivity detection request information is sent by the source node routing bridge 310A (that is, the source node), where the nickname of the source node is used to identify which routing bridge is the source node during a multicast process, the multicast distribution tree nickname is used to identify a designated multicast distribution tree, the nicknames of the target nodes are used to identify which routing bridge is a designated target node during the multicast process, and the hop count is used to represent the number of forwardings that can be performed from the source node. There may be one or more target nodes.

Figure 1:
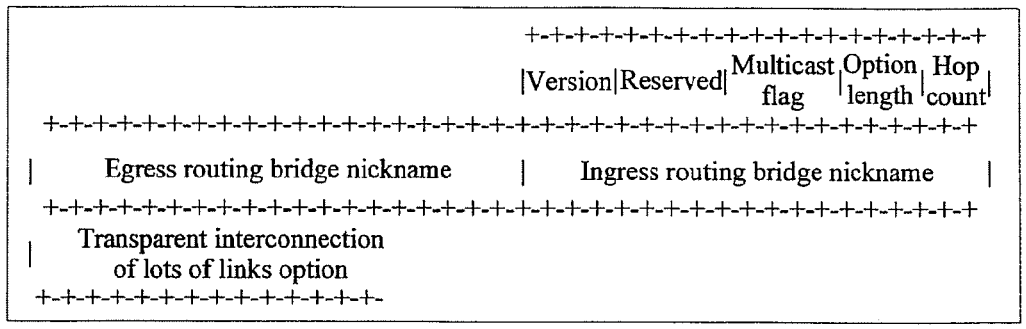
FIG. 1 is a schematic diagram of a header format of a TRILL packet.
Figure 2:
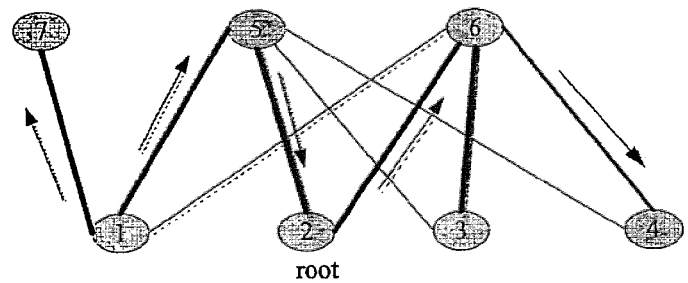
FIG. 2 is a schematic diagram of testing a multicast path by using traceroute in the prior art.

In specific implementation, the connectivity detection request information is sent by using an OAM packet carried in an OAM channel of the TRILL protocol. The nickname of the source node, the multicast distribution tree nickname, and the hop count that are included in the connectivity detection request information may be defined in a TRILL header, and a format of the TRILL header is shown in FIG. 1, where the egress routing bridge nickname may be used to store the multicast distribution tree nickname and the ingress routing bridge nickname may be used to store the nickname of the source node.

Figure 6:
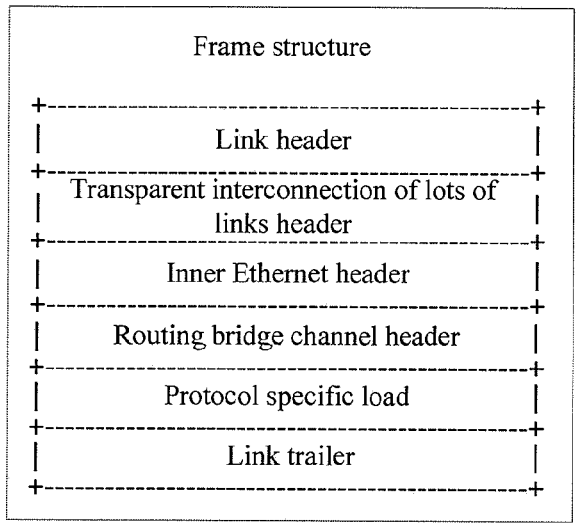
FIG. 6 is a schematic diagram of a header format of an OAM packet used in the TRILL protocol.

In a specific application, the TRILL protocol uses a channel used to carry an OAM packet. A format of the channel is shown in FIG. 6, which includes a link header, a TRILL header, an inner Ethernet header, a routing bridge channel header, a protocol specific payload, and a link trailer. The TRILL header is the header shown in FIG. 1, the inner Ethernet header is an original Ethernet header, and the protocol specific payload may be used to store the nicknames of the target nodes. In this way, during a process of forwarding the OAM packet through multicasting, when receiving the OAM packet, a routing bridge decapsulates the OAM packet to obtain the connectivity detection request information, that is, to obtain the nickname of the source node, the multicast distribution tree nickname, and the hop count that are in the TRILL header, and the nicknames of the target nodes in the protocol specific payload. The OAM packet channel may not use the format show in FIG. 6 completely. So long as an identifier can differentiate the OAM packet of the TRILL from a common data packet, it may be considered that the OAM packet channel is used.

Step 520: Determine, according to the nicknames of the target nodes, whether a node that receives the connectivity detection request information is one of the target nodes. If the node is one of the target nodes, step 530 is performed; if the node is not one of the target nodes, step 590 is performed.

After receiving the connectivity detection request information, the non-source node routing bridge 320A sends the connectivity detection request information to a processor of the non-source node routing bridge 320A for processing; the processor compares the nicknames of the target nodes in the connectivity detection request information with a node nickname of the non-source node routing bridge 320A, and determines whether the non-source node routing bridge 320A is one of the target nodes.

Step 530: If the node that receives the connectivity detection request information is one of the target nodes, the node that receives the connectivity detection request information sends connectivity detection reply information to the source node.

If it is determined that the non-source node routing bridge 320A is a target node, a source node is determined according to the nickname of the source node in the connectivity detection request information, and the connectivity detection reply information is sent to the source node.

Step 540: Determine whether the hop count is a set threshold. If the hop count is the set threshold, step 550 is performed; if the hop count is not the set threshold, step 560 is performed.

The set threshold here is a preset value, and the threshold is a critical value at which a value of the hop count changes from a valid value to an invalid value; the valid value indicates that the node can forward the received connectivity detection request information, while the invalid value indicates that the node cannot continue to forward the received connectivity connection request information. The threshold is generally 1. Generally, when sending the connectivity detection request information for the first time, the source node routing bridge initializes the value of the hop count and the value becomes 1, which indicates that the connectivity detection request information can be forwarded once. In this case, it is determined accordingly that the hop count is the set threshold.

Step 550: If the hop count is the set threshold, discarding the connectivity detection request information.

In this case, if the hop count is the set threshold, that is, the hop count is 1, after the node that receives the connectivity detection request information deducts the hop count by 1, the hop count becomes 0. Therefore, the connectivity detection request information is not forwarded again.

Step 560: If the hop count is not the set threshold, determine whether the node that receives the connectivity detection request information is on a path that is in the multicast distribution tree and is from the source node to any one of the target nodes. If the node is on a path that is in the multicast distribution tree and is from the source node to any one of the target nodes, step 570 is performed; if the node is not on any path that is in the multicast distribution tree and is from the source node to any one of the target nodes, step 580 is performed.

That is, if the node that receives the connectivity detection request information is a target node but the hop count is not the set threshold, that is, the hop count is greater than 1 and the hop count is not 0 after it is deducted by 1, whether the node that receives the connectivity detection request information is on a path from the source node to another target node is further determined.

Step 570: If the node that receives the connectivity detection request information is on a path that is in the multicast distribution tree and is from the source node to any one of the target nodes, deduct the hop count by 1, and forward the connectivity detection request information including an updated hop count to a next hop node corresponding to a target node.

The target node here is a target node corresponding to the node that receives the connectivity detection request information when it is determined that the node is on a path from the source node to a target node. There may be one or more target nodes.

If the hop count is not the set threshold, it indicates that the hop count is greater than 1. In this case, the hop count is not 0 after it is deducted by 1, and next forwarding may be performed. Therefore, the hop count is deducted by 1 to generate latest connectivity detection request information including a latest hop count, and the latest connectivity detection request information is forwarded to a next hop node corresponding to the current target node.

Before the connectivity detection request information is forwarded, a next hop node needs to be obtained first. A process of obtaining a next hop node is specifically as follows: querying a pre-stored database to obtain a next hop node according to path information in the database, where the database stores information about a path that is in the multicast distribution tree and is from the source node to each target node. The path information here is obtained by calculation after the multicast distribution tree, the source node, and the target node are determined, and is stored in a database of each node on the path, where the database is called a link state database (LSDB). Obtaining the path information in the database can be implemented by persons of ordinary skill in the art and is not a key point of the present invention, which is not further described.

Step 580: If the node is not on a path that is in the multicast distribution tree and is from the source node to any one of the target nodes, discarding the connectivity detection request information.

Step 590: If the node is not one of the target nodes, determine whether the hop count is the set threshold. If the hop count is not the set threshold, step S560 is performed; if the hop count is the set threshold, step S5100 is performed.

Step 5100: If the hop count is the set threshold, send unreachable information to the source node according to the nickname of the source node, and discarding the connectivity detection request information.

If the hop count is the set threshold, it indicates that when the node is not a target node, the hop count is 1, and the hop count is 0 after it is deducted by 1, so that next forwarding cannot be performed. A source node is determined according to the nickname of the source node, and unreachable information is sent to the source node.

In conclusion, by using the method for detecting connectivity according to Embodiment 2 of the present invention, connectivity detection request information of a plurality of designated target nodes can be sent on a source node, so that all the designated target nodes in a multicast distribution tree can send connectivity detection reply information to the source node, while all non-target nodes that are in the multicast distribution tree and on a designated path from the source node to a target node send unreachable information to the source node. In this way, connectivity detection and fault diagnosis can be performed on the plurality of designated target nodes, and the source node is capable of receiving only information sent by a node on a true path, thereby making it easier to identify a path.

In the following, connectivity detection is performed on a node on a specific network according to the method for detecting connectivity described in Embodiment 2. For details, reference may be made to Embodiment 3.

Embodiment 3

Figure 7:
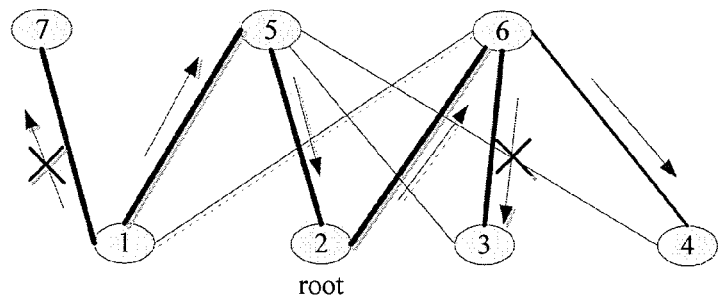
FIG. 7 is a schematic diagram of testing a multicast path by using traceroute according to Embodiment 3 of the present invention.

FIG. 7 is a schematic diagram of testing a multicast path by using traceroute according to Embodiment 3 of the present invention. FIG. 7 shows a routing bridge RB1 to a routing bridge RB7, where a tree formed by bold lines connecting the routing bridges is a multicast distribution tree tree2, and a routing bridge RB2 is a root of the multicast distribution tree. By using the routing bridge RB1 as a source node (corresponding to the source node routing bridge 310A in FIG. 3A) and using a routing bridge RB5 and a routing bridge RB4 as target nodes (corresponding to the non-source node routing bridge 324A in FIG. 3A), connectivity detection is performed on the source node RB1 to the target nodes RB4 and RB5. A specific process is as follows:

Step A: The source node routing bridge RB1 generates connectivity detection request information, where the connectivity detection request information includes a nickname of the source node RB1, a nickname of the designated multicast distribution tree tree2, nicknames of the target nodes RB4 and RB5, and a hop count, where the hop count is initially set to 1. The source node RB1 searches a corresponding database (for example, a LSDB). In the multicast distribution tree tree2, a next hop of a path (that is, 1→5→2→6→4) to the target node RB4 is the routing bridge RB5, and the source node RB1 sends the connectivity detection request information to the routing bridge RB5.

Step B: After receiving the connectivity detection request information, the routing bridge RB5 sends the connectivity detection request information to a processor (for example, a CPU) for processing. The processor in the routing bridge RB5 determines that the routing bridge RB5 is one of the target nodes, so that the routing bridge RB5 sends connectivity detection reply information to the source node as a reply. In this case, because the hop count is 1, and the hop count is 0 after it is deducted by 1, the connectivity detection request information is not forwarded continuously.

Step C: The routing bridge RB1 sends connectivity detection request information same as that in step A, but sets the hop count to 2. Similar to the foregoing step A, the routing bridge RB1 searches its LSDB, and forwards the connectivity detection request information to the next hop routing bridge RB5.

Step D: After receiving the connectivity detection request information, the routing bridge RB5 sends the connectivity detection request information to the processor, and the processor finds that the routing bridge RB5 is one of the target nodes. Therefore, the routing bridge RB5 sends connectivity detection reply information to the source node as a reply. In this case, the hop count is 2, the routing bridge RB5 searches its LSDB, and finds that the routing bridge RB5 is on a path from the source node RB1 to the target node RB4. Then, the routing bridge RB5 learns, by using the LSDB, that a next hop node to the target node RB4 is the RB2, and deducts the hop count by 1. In this case, information about the hop count in the connectivity detection request information is changed to a value deducted by 1, other information in the connectivity detection request information remains unchanged, and the routing bridge RB5 forwards updated connectivity detection request information to the next hop RB2.

Step E: After receiving the updated connectivity detection request information, the routing bridge RB2 finds that it is not a target node. Because the hop count is 1, the hop count is 0 after it is deducted by 1. In this case, the routing bridge RB2 sends unreachable information to the routing bridge RB1, and stops forwarding the connectivity detection request information.

Step F: The routing bridge RB1 continues to send connectivity detection request information, and sets the hop count to 3 and 4 in sequence until the routing bridge RB4 receives the connectivity detection request information. After a processor of the routing bridge RB4 determines that the routing bridge RB4 is a target node, the routing bridge RB4 sends connectivity detection reply information to the routing bridge RB1 as a reply.

It may be seen from the above that the method for detecting connectivity is based on an assumption that after receiving related connectivity detection request information, each routing bridge sends the connectivity detection request information to a processor for processing, and further determines, according to a processing result, whether to continue to forward the connectivity detection request information and to which routing bridge the connectivity detection request information is forwarded according to an LSDB.

In conclusion, by using the method for detecting connectivity according to Embodiment 3 of the present invention, connectivity detection request information of a plurality of designated target nodes can be sent on a source node, so that all the designated target nodes in a multicast distribution tree can send connectivity detection reply information to the source node, while all non-target nodes that are in the multicast distribution tree and on a designated path from the source node to a target node send unreachable information to the source node. In this way, connectivity detection and fault diagnosis can be performed on the plurality of designated target nodes, and the source node is capable of receiving only information sent by a node on a true path, thereby making it easier to identify a path.

Corresponding to the connectivity detection request information received and processed in Embodiment 2, the present invention may further provide a corresponding method for sending connectivity detection request information. For details, reference may be made to Embodiment 4.

Embodiment 4

Figure 8:
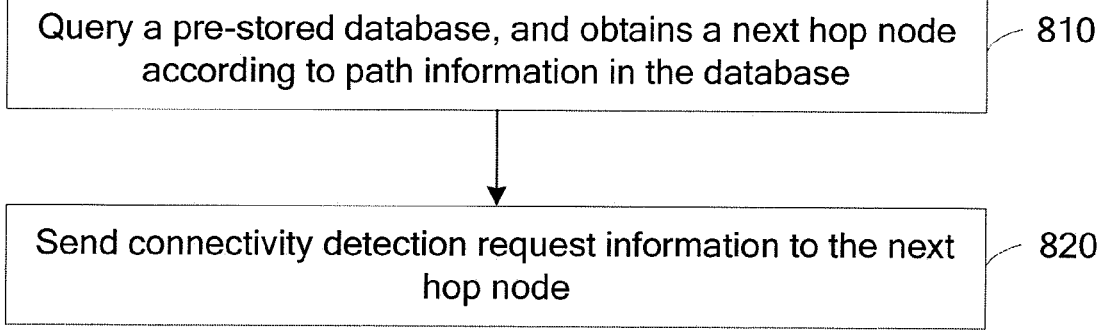
FIG. 8 is a flowchart of a method for sending connectivity detection request information according to Embodiment 4 of the present invention.

FIG. 8 is a flowchart of a method for sending connectivity detection request information according to Embodiment 4 of the present invention. The method for sending connectivity detection request information is implemented on the source node routing bridge 310A in FIG. 3A. The method for sending connectivity detection request information includes:

Step 810: Query a pre-stored database, and obtains a next hop node according to path information in the database.

The database stores information about a path that is in a multicast distribution tree and is from a source node to a target node. Generally, after a source node, a multicast distribution tree, and a target node (one or more) are designated, information about a path that is in the multicast distribution tree and is from the source node to each target node may be learnt by calculation. The path information is generally stored in a database of each routing bridge, and when a routing bridge needs to perform forwarding, the routing bridge may learn a next hop routing bridge node according to the path information in the database.

Step 820: Send connectivity detection request information to the next hop node.

The connectivity detection request information includes a nickname of the source node, a multicast distribution tree nickname, a nickname of the target node, and a hop count.

The nickname of the source node is used to identify which routing bridge is a source node during a multicast process, the multicast distribution tree nickname is used to identify a designated multicast distribution tree, the nickname of the target node is used to identify which routing bridge or which routing bridges are the designated target node during the multicast process, and the hop count is used to represent the number of forwardings that can be performed from the source node.

The nickname of the source node, the multicast distribution tree nickname, and the hop count that are in the connectivity detection request information may be defined in a TRILL header, and a format of the TRILL header is shown in FIG. 1, where the egress routing bridge nickname may be used to store the multicast distribution tree nickname and the ingress routing bridge nickname may be used to store the nickname of the source node.

In a specific application, the TRILL protocol uses a channel used to carry an OAM packet. A format of the channel is shown in FIG. 6, which includes a link header, a TRILL header, an inner Ethernet header, a routing bridge channel header, a protocol specific payload, and a link trailer. The TRILL header is the header shown in FIG. 1, the inner Ethernet header is an original Ethernet header, and the protocol specific payload may be used to store the nickname of the target node. In this way, during a process of forwarding the OAM packet through multicasting, when receiving the OAM packet, a routing bridge decapsulates the OAM packet to obtain the nickname of the source node, the multicast distribution tree nickname, and the hop count in the TRILL header, and the nickname of the target node in the protocol specific load. Assuredly, in specific implementation, the nickname of the target node may also be stored in the OAM packet in another manner.

Generally, during an initial transmission, only step 810 and step 820 need to be performed. During a subsequent multicast process, the source node routing bridge 310A may also receive unreachable information sent by the non-source node routing bridge 320A. In this case, the source node routing bridge 310A first adds 1 to the hop count in the connectivity detection request information, and then step 810 and step 820 are performed.

In a specific application, when the non-source node routing bridge 320A determines that the non-source node routing bridge 320A is not a target node and is not on a path that is in the multicast distribution tree and is from the source node to a target node, the non-source node routing bridge 320A sends unreachable information to the source node routing bridge 310A (that is, the source node).

Generally, the unreachable information includes a nickname of a node that sends the unreachable information, so that the source node easily identifies the node that sends the unreachable information and a path formed by all nodes that send unreachable information.

In conclusion, in the method for sending connectivity detection request information according to Embodiment 4 of the present invention, a multicast distribution tree may be designated, and a plurality of target nodes may also be designated, so that connectivity check and fault diagnosis can be performed directly on the plurality of designated target nodes, thereby featuring high pertinence and high efficiency.

Embodiment 5

Figure 9:
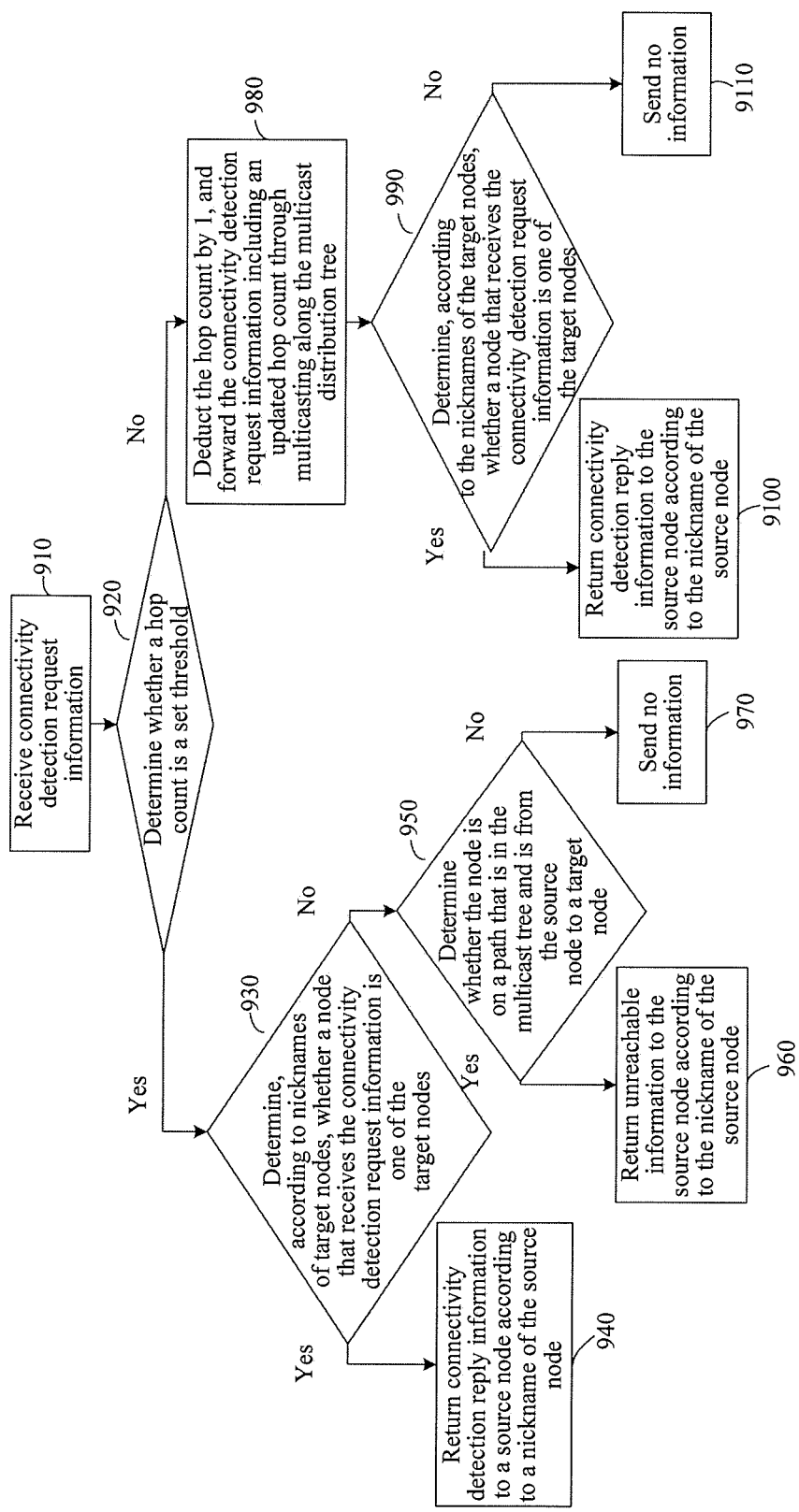
FIG. 9 is a flowchart of a method for detecting connectivity according to Embodiment 5 of the present invention.

FIG. 9 is a flowchart of a method for detecting connectivity according to Embodiment 5 of the present invention.

The method for detecting connectivity is performed on the non-source node routing bridge 320B in FIG. 3B, for example, connectivity detection request information may be processed through multicasting by any one of the non-source node routing bridge 321B, the non-source node routing bridge 322B . . . the non-source node routing bridge 323B, or the non-source node routing bridge 325B and the non-source node routing bridge 326B. The method for detecting connectivity includes:

Step 910: Receive connectivity detection request information.

The connectivity detection request information includes a nickname of a source node, a multicast distribution tree nickname, nicknames of target nodes, and a hop count.

Generally, the connectivity detection request information is sent by the source node routing bridge 310B (that is, the source node), where the nickname of the source node is used to identify which routing bridge is a source node during a multicast process, the multicast distribution tree nickname is used to identify a designated multicast distribution tree, the nicknames of the target nodes are used to identify which routing bridge is the designated target node (there may be one or more target nodes) during the multicast process, and the hop count is used to represent the number of forwardings that can be performed from the source node.

In specific implementation, the nickname of the source node, the multicast distribution tree nickname, and the hop count that are included in the connectivity detection request information may be defined in a TRILL header, and a format of the TRILL header is shown in FIG. 1, where the egress routing bridge nickname may be used to store the multicast distribution tree nickname and the ingress routing bridge nickname may be used to store the nickname of the source node.

In a specific application, the TRILL protocol uses a channel used to carry an OAM packet. A format of the channel is shown in FIG. 6, which includes a link header, a TRILL header, an inner Ethernet header, a routing bridge channel header, a protocol specific payload, and a link trailer. The TRILL header is the header shown in FIG. 1, the inner Ethernet header is an original Ethernet header, and the protocol specific payload may be used to store the nicknames of the target nodes. In this way, during a process of forwarding the OAM packet through multicasting, when receiving the OAM packet, a routing bridge decapsulates the OAM packet to obtain the nickname of the source node, the multicast distribution tree nickname, and the hop count in the TRILL header, and the nicknames of the target nodes in the protocol specific load.

Step 920: Determine whether the hop count in the connectivity detection request information is a set threshold. If the hop count is the set threshold, step 930 is performed; if the hop count is not the set threshold, step 980 is performed.

In a specific application, after receiving the connectivity detection request information, the non-source node routing bridge 320B first determines whether the hop count in the connectivity detection request information is a set threshold, where the set threshold may be generally set to 1.

Step 930: If it is determined that the hop count in the connectivity detection request information is the set threshold, determine whether a node that receives the connectivity detection request information is one of the target nodes according to the nicknames of the target nodes. If the node is one of the target nodes, step 940 is performed; if the node is not one of the target nodes, step 950 is performed.

A nickname of the non-source node routing bridge 320B (a local node that is processing multicast data) is compared with the nicknames of the designated target nodes in the connectivity detection request information, and whether the local node is one of the target nodes is determined.

Step 940: If the node that receives the connectivity detection request information is one of the target nodes, the node that receives the connectivity detection request information sends connectivity detection reply information to the source node according to the nickname of the source node.

Step 950: If the node that receives the connectivity detection request information is not one of the target nodes, determine whether the node that receives the connectivity detection request information is on a path that is in the multicast distribution tree and is from the source node to a target node. If the node is on a path that is in the multicast distribution tree and is from the source node to any one of the target nodes, step 960 is performed; if the node is not on any path that is in the multicast distribution tree and is from the source node to any one of the target nodes, step 970 is performed.

Step 960: If the node that receives the connectivity detection request information is on a path, the node sends unreachable information to the source node according to the nickname of the source node.

In this case, it is determined that the hop count is the set threshold, that is, the hop count is 1. However, the local node is not a target node but is on the designated path, which indicates that a multicast path from the source node to a designated target node passes the local node and the local node needs to send unreachable information to the source node.

Step 970: If the node that receives the connectivity detection request information is not on any path that is in the multicast distribution tree and is from the source node to any one of the target nodes, send no information.

In this case, it is determined that the hop count is the set threshold, that is, the hop count is 1. However, the local node is neither a target node nor is on the designated path, which indicates that the multicast path from the source node to the designated target node does not pass the local node and the local node does not need to send any information to the source node.

Step 980: If the hop count in the connectivity detection request information is not the set threshold, deduct the hop count by 1, and forward the connectivity detection request information including an updated hop count through multicasting along the multicast distribution tree.

The set threshold is generally a critical value at which a value of the hop count changes from a valid value to an invalid value; the valid value indicates that the node can forward the received connectivity detection request information, while the invalid value indicates that the node cannot continue to forward the received connectivity connection request information.

If the hop count in the connectivity detection request information is not the set threshold, it indicates that the value of the hop count is greater than the set threshold, for example, when the set threshold is set to 1, the value of the hop count is greater than 1. If the value of the hop count is greater than 1, it indicates that the connectivity detection request information can be further forwarded at least once.

When the connectivity detection request information is forwarded through multicasting along the multicast distribution tree, a database (for example, a LSDB) in the local node is first checked, all nodes connected to the local node in the multicast distribution tree are used as next hop targets, that is, the connectivity detection request information is forwarded to all the next hop targets. The database is a series of paths calculated according to the source node, the multicast distribution tree, and the target nodes, and each path is a path that is in the multicast distribution tree and is from the source node to a target node.

Step 990: Determine, according to the nicknames of the target nodes, whether a node that receives the connectivity detection request information is one of the target nodes. If the node is one of the target nodes, step 9100 is performed; if the node is not one of the target nodes, step 9110 is performed.

The nickname of the non-source node routing bridge 320B (the local node that is processing multicast data) is compared with the nicknames of the designated target nodes in the connectivity detection request information, and whether the local node is one of the target nodes is determined.

Step 9100: If the node that receives the connectivity detection request information is one of the target nodes, send connectivity detection reply information to the source node according to the nickname of the source node.

In this case, it is determined that the hop count is the set threshold, that is, the hop count is not 1 and is greater than 1. At this time, the local node is a target node, and needs to send connectivity detection reply information to the source node.

Step 9110: If the node that receives the connectivity detection request information is not one of the target nodes, send no information. In this case, it is determined that the hop count is not the set threshold 1, that is, the hop count is greater than 1, but the local node is not one of the target nodes. At this time, the local node does not need to send any information to the source node.

That is, when the hop count in the connectivity detection request information is not equal to the set threshold, a non-target node routing bridge only needs to deduct the hop count by 1 and continue to forward the connectivity detection request information. However, a target node routing bridge not only needs to continue to forward the connectivity detection request information after deducting the hop count by 1, but also needs to send connectivity detection reply information to the source node.

In conclusion, by using the method for detecting connectivity according to Embodiment 5 of the present invention, connectivity detection request information of a plurality of designated target nodes can be sent on a source node, so that all the designated target nodes in a multicast distribution tree can send connectivity detection reply information to the source node, while all non-target nodes that are in the multicast distribution tree and on a designated path from the source node to a target node send unreachable information to the source node. In this way, connectivity detection and fault diagnosis can be performed on the plurality of designated target nodes, and the source node is capable of receiving only information sent by a node on a true path, thereby making it easier to identify a path.

In the following, connectivity detection is performed on a node on a specific network according to the method for detecting connectivity described in Embodiment 5. For details, reference may be made to Embodiment 6.

Embodiment 6

Figure 10:
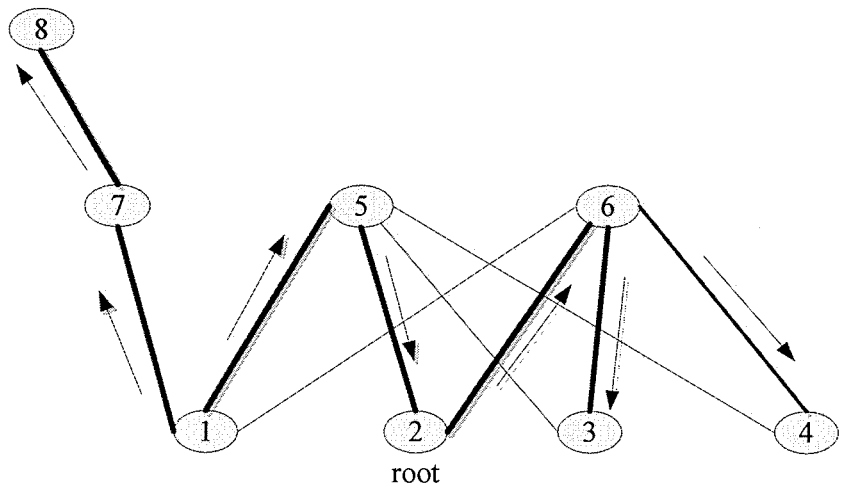
FIG. 10 is a schematic diagram of testing a multicast path by using traceroute according to Embodiment 6 of the present invention.

FIG. 10 is a schematic diagram of testing a multicast path by using traceroute according to Embodiment 6 of the present invention. FIG. 10 shows a routing bridge RB1 to a routing bridge RB8, where a tree formed by black lines connecting routing bridges is a multicast distribution tree tree3, and a routing bridge RB2 is a root of the multicast distribution tree tree3. By using the routing bridge RB1 as a source node (corresponding to the source node routing bridge 310B in FIG. 3B) and using the routing bridge RB2 and a routing bridge RB4 as target nodes (corresponding to the non-source node routing bridge 324B in FIG. 3B), connectivity detection is performed on the source node RB1 to the target nodes RB4 and RB2. A specific process is as follows:

Step a: The source node routing bridge RB1 generates connectivity detection request information, where the connectivity detection request information includes a nickname of the source node RB1, a nickname of the designated multicast distribution tree tree3, nicknames of the target nodes RB4 and RB2, and a hop count, where the hop count is set to 1. The source node RB1 directly copies and forwards multicast connectivity detection request information in the tree3, that is, the source node RB1 forwards the connectivity detection request information to a routing bridge RB5 and a routing bridge RB7.

Step b: The routing bridge RB5 and the routing bridge RB7 receive the connectivity detection request information. Because the hop count is 1, the connectivity detection request information is sent to CPUs for processing. After the processors of the routing bridge RB5 and the routing bridge RB7 process the connectivity detection request information, the routing bridge RB5 and the routing bridge RB7 find that they are not the target nodes. The routing bridge RB5 searches its link state database LSDB, and finds that it is in the tree3 and on a path from the source node routing bridge RB1 to the target node routing bridge RB4. In this case, the routing bridge RB5 sends unreachable information to the source node routing bridge RB1. The routing bridge RB7 also searches its link state database LSDB, and finds that the routing bridge RB7 is in the tree3 but is not on the path from the RB1 to the RB4. Therefore, the routing bridge RB7 does not send unreachable information to the source node routing bridge RB1. Because the hop count in the connectivity detection request information received by the routing bridge RB5 and the routing bridge RB7 is 1 and equal to the set threshold, the hop count is 0 after it is deducted by 1. Therefore, the RB5 and the RB7 do not continue to forward the connectivity detection request information.

Step c: The routing bridge RB1 sends connectivity detection request information same as that in step a, but sets the hop count to 2. The connectivity detection request information reaches the routing bridge RB5 and the routing bridge RB7; after deducting the hop count by 1, the routing bridge RB5 and the routing bridge RB7 continue to forward the connectivity detection request information including an updated hop count respectively. In addition, the routing bridge RB5 and the routing bridge RB7 send the connectivity detection request information to the CPUs for processing. After the CPUs process the connectivity detection request information, the routing bridge RB5 and the routing bridge RB7 find that they are not the target nodes in the connectivity detection request information and the hop count is greater than 1. Therefore, the routing bridge RB5 and the routing bridge RB7 do not give any reply to the routing bridge RB1.

Step d: The routing bridge RB2 and the routing bridge RB8 receive the connectivity detection request information forwarded by the routing bridge RB5 and the routing bridge RB7 respectively, where the hop count in the connectivity detection request information is 1. Because the hop count is 1, the connectivity detection request information is not further forwarded and is only sent to CPUs. When the connectivity detection request information is sent to the CPUs for processing, the routing bridge RB2 finds that it is one of the target nodes, and therefore sends connectivity detection reply information to the source node. However, the routing bridge RB8 finds that it is not one of the target nodes. In this case, the routing bridge RB8 searches its link state database LSDB, and finds that the routing bridge RB8 is in the tree3 but is not on the path from the source node routing bridge RB1 to the target node routing bridge RB4. Therefore, the routing bridge RB8 does not send unreachable information to the source node routing bridge RB1.

Step e: The source node routing bridge RB1 continues to send connectivity detection request information, and sets the hop count to 3 and 4 in sequence. This process lasts until the target node routing bridge RB4 receives the connectivity detection request information. The target node routing bridge RB4 finds that it is one of the target nodes, and sends connectivity detection reply information to the source node routing bridge RB1.

In this way, during a multicast process, the source node routing bridge RB1 receives unreachable information from the routing bridges RB5 and RB6 in sequence, and finally receives connectivity detection reply information from the target node routing bridges RB2 and RB4.

During the foregoing multicast process, each node that receives the connectivity detection request information first forwards the information through common multicasting, and then determines whether the node itself is a target node and whether to send related information to the source node. The source node also performs forwarding through common multicasting.

In conclusion, by using the method for detecting connectivity according to Embodiment 6 of the present invention, connectivity detection request information of a plurality of designated target nodes can be sent on a source node, so that all the designated target nodes in a multicast distribution tree can send connectivity detection reply information to the source node, while all non-target nodes that are in the multicast distribution tree and on a path from the source node to a target node send unreachable information to the source node. In this way, connectivity detection and fault diagnosis can be performed on the designated target nodes, and the source node is capable of receiving only information sent by a node on a true path, thereby making it easier to identify a path.

Corresponding to the connectivity detection request information received and processed in Embodiment 5, the present invention may further provide a corresponding method for sending connectivity detection request information. For details, reference may be made to Embodiment 7.

Embodiment 7

Figure 11:
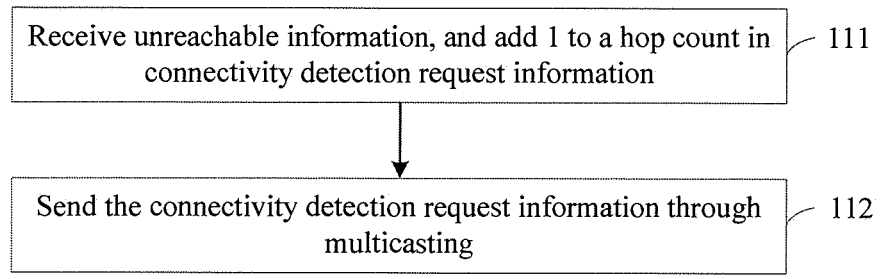
FIG. 11 is a flowchart of a method for sending connectivity detection request information according to Embodiment 7 of the present invention.

FIG. 11 is a flowchart of a method for sending connectivity detection request information according to Embodiment 7 of the present invention. The method for sending connectivity detection request information is implemented on the source node routing bridge 310B in FIG. 3B. The method for sending connectivity detection request information includes:

Step 111: Receive unreachable information, and add 1 to a hop count in connectivity detection request information according to the unreachable information.

When the non-source node routing bridge 320B determines that it is not a target node and is on a path that is in a multicast distribution tree and is from a source node to a target node, the non-source node routing bridge 320B sends the unreachable information to the source node routing bridge 310B (that is, the source node).

Generally, the unreachable information includes a nickname of a node that sends the unreachable information. In this way, the source node easily identifies the node that sends the unreachable information and a path formed by all nodes that send unreachable information.

Step 112: Send the connectivity detection request information through multicasting.

When forwarding the connectivity detection request information, the source node here may forward the connectivity detection request information through common multicasting, that is, it may forward the connectivity detection request information to all routing bridges that is in the multicast distribution tree and connected to the source node directly.

The connectivity detection request information here generally includes a nickname of the source node, a nickname of the designated multicast distribution tree, nicknames of target nodes, and a hop count.

It should be noted that when forwarding the connectivity detection request information for the first time, the source node routing bridge 310B sends the connectivity detection request information directly through multicasting, that is, only step 112 is performed. During a subsequent multicast process, the source node routing bridge 310B receives unreachable information returned by the non-source node routing bridge 320B continuously. Step 111 and step 112 are performed only in this case.

In conclusion, in the method for sending connectivity detection request information according to Embodiment 7 of the present invention, a multicast distribution tree may be designated, and a plurality of target nodes may also be designated, so that connectivity check and fault diagnosis can be performed directly on the plurality of designated target nodes, thereby featuring high efficiency.

Embodiment 8

Figure 12:
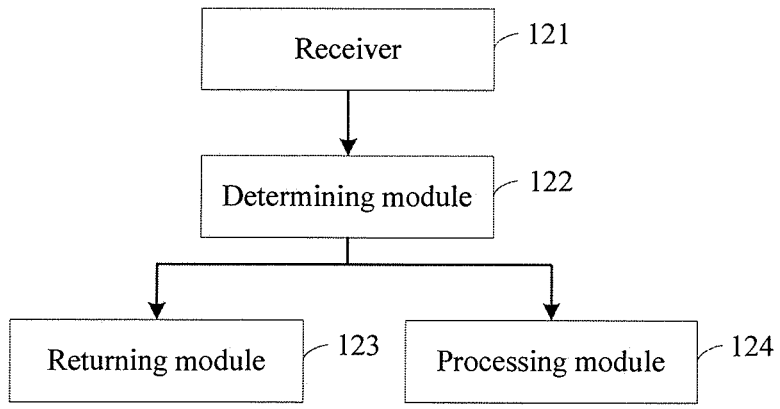
FIG. 12 is a schematic structural diagram of an apparatus for detecting connectivity according to Embodiment 8 of the present invention.

FIG. 12 is a schematic structural diagram of an apparatus for detecting connectivity according to Embodiment 8 of the present invention. The apparatus for detecting connectivity apparatus includes a receiver 121, a determining module 122, a transmitter 123, and a processing module 124.

The receiver 121 may be configured to receive connectivity detection request information, where the connectivity detection request information includes a nickname of a source node, a nickname of a multicast distribution tree, nicknames of target nodes, and a hop count.

The determining module 122 may be configured to determine, according to the nicknames of the target nodes, whether a node that receives the connectivity detection request information is one of the target nodes.

The transmitter 123 may be configured to: when the determining module 122 determines that the node is one of the target nodes, send connectivity detection reply information to the source node according to the nickname of the source node.

The processing module 124 may be configured to: when the determining module 122 determines that the node is not one of the target nodes, perform corresponding processing according to a value of the hop count and whether the node is on a path that is in the multicast distribution tree and is from the source node to any one of the target nodes.

In conclusion, in the apparatus for sending connectivity detection request information according to Embodiment 8 of the present invention, a multicast distribution tree may be designated, and a plurality of target nodes may also be designated, so that connectivity check and fault diagnosis can be performed directly on the plurality of designated target nodes, thereby featuring high efficiency.

During an actual application, besides a structure shown in Embodiment 8, the apparatus for detecting connectivity may also include a more specific structure. For details, reference may be made to Embodiment 9 and Embodiment 10.

Embodiment 9

Figure 13:
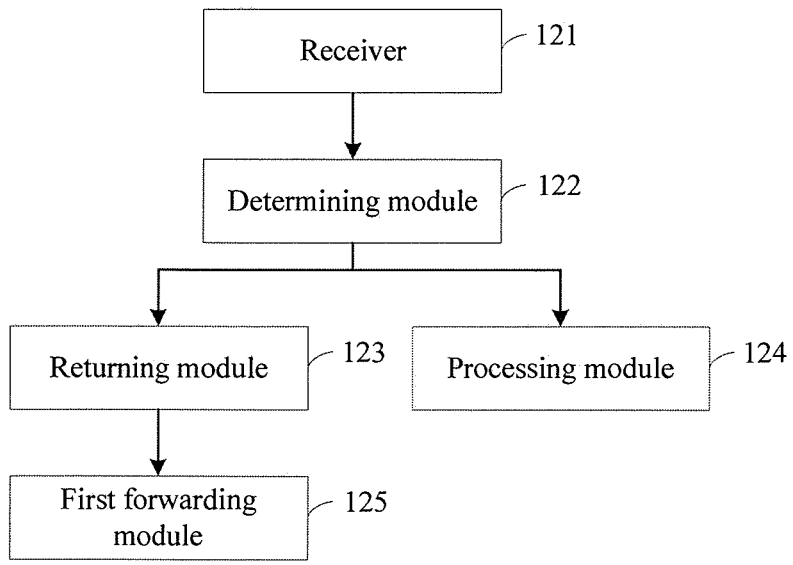
FIG. 13 is a schematic structural diagram of an apparatus for detecting connectivity according to Embodiment 9 of the present invention.

FIG. 13 is a schematic structural diagram of an apparatus for detecting connectivity according to Embodiment 9 of the present invention. The apparatus for detecting connectivity includes the receiver 121, the determining module 122, the returning module 123, and the processing module 124 shown in Embodiment 8, and further includes a first forwarding module 125.

In this embodiment, the receiver 121, the determining module 122, and the returning module 123 plays a role same as that shown in FIG. 12, which is not described herein again.

The first forwarding module 125 may be configured to determine whether the hop count is a set threshold; if the hop count is not the set threshold, determine whether the node is on a path that is in the multicast distribution tree and is from the source node and any one of the target nodes; if the node is on a path that is in the multicast distribution tree and is from the source node to any one of the target nodes, deduct the hop count by 1, and forward the connectivity detection request information including an updated hop count to a next hop node corresponding to a target node; and if the hop count is the set threshold, discarding the connectivity detection request information.

The processing module 124 here may be specifically configured to: when the determining module 122 determines that the node is not one of the target nodes, determine whether the hop count is the set threshold; if the hop count is the set threshold, send unreachable information to the source node according to the nickname of the source node, and discarding the connectivity detection request information; if the hop count is not the set threshold, deduct the hop count by 1, and forward the connectivity detection request information including an updated hop count to a next hop corresponding to a target node.

It should be noted that when the apparatus for detecting connectivity provided by the foregoing embodiment is specifically described, division of the foregoing functional modules is used as an example only; in an actual application, the foregoing function allocation can be completed by different functional modules as required, that is, an internal structure of the apparatus is divided into different functional modules to perform all or some of the foregoing functions. In addition, the apparatus for detecting connectivity provided by the foregoing embodiment and Embodiment 2 of the method for detecting connectivity belong to a same idea. For a specific implementation process of the apparatus for detecting connectivity, reference may be made to the method embodiments, which are not described herein again.

In conclusion, in the apparatus for detecting connectivity according to Embodiment 9 of the present invention, a multicast distribution tree may be designated, and a plurality of target nodes may also be designated, so that connectivity check and fault diagnosis can be performed directly on the plurality of designated target nodes, thereby featuring high efficiency.

Embodiment 10

Figure 14:
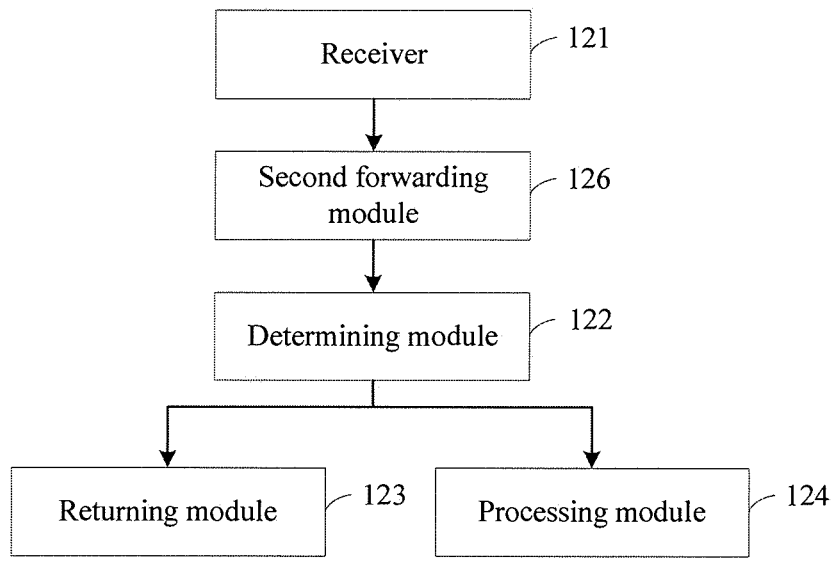
FIG. 14 is a schematic structural diagram of an apparatus for detecting connectivity according to Embodiment 10 of the present invention.

FIG. 14 is a schematic structural diagram of an apparatus for detecting connectivity according to Embodiment 9 of the present invention. The apparatus for detecting connectivity includes the receiver 121, the determining module 122, the transmitter 123, and the processing module 124 shown in Embodiment 8, and further includes a second forwarding module 126.

In this embodiment, the receiver 121, the determining module 122, and the transmitter 123 plays a role same as that shown in FIG. 12, which is not described herein again.

The second forwarding module 126 may be configured to determine whether the hop count is a set threshold; if the hop count is not the set threshold, deduct the hop count by 1, and forward the connection detection request information including an updated hop count through multicasting along the multicast distribution tree.

The processing module 124 here may be configured to: if the determining module 122 determines that the node is not one of the target nodes, when the hop count is the set threshold, determine whether the node is on a path that is in the multicast distribution tree and is from the source node to the target node; if the node is on a path that is in the multicast distribution tree and is from the source node to any one of the target nodes, send unreachable information to the source node according to the nickname of the source node; if the node is not on any path that is in the multicast distribution tree and is from the source node to any one of the target nodes, send no information; and when the hop count is not the set threshold, send no information.

It should be noted that when the apparatus for detecting connectivity provided by the foregoing embodiment is specifically described, division of the foregoing functional modules is used as an example only. In an actual application, the foregoing function allocation can be completed by different functional modules as required, that is, an internal structure of the apparatus is divided into different functional modules to perform all or some of the foregoing functions. In addition, the apparatus for detecting connectivity provided by the foregoing embodiment and Embodiment 5 of the method for detecting connectivity belong to a same idea. For a specific implementation process of the apparatus for detecting connectivity, reference may be made to the method embodiments, which are not described herein again.

In conclusion, in the apparatus for sending connectivity detection request information according to Embodiment 10 of the present invention, a multicast distribution tree may be designated, and a plurality of target nodes may also be designated, so that connectivity check and fault diagnosis can be performed directly on the plurality of designated target nodes, thereby featuring high efficiency.

A person of ordinary skill in the art may understand that all or a part of the steps of the embodiments may be implemented by hardware or a program instructing relevant hardware. The program may be stored in a computer readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the principle of the present invention shall fall within the protection scope of the present invention.

What is claimed is:

1. A method for detecting connectivity, the method comprising:
   receiving, by a routing bridge, a connectivity detection request packet comprising at least: a nickname of a source node, a nickname of a multicast distribution tree, a nickname of at least one target node, and a hop count value, wherein the routing bridge is a non-source node that is in the multicast distribution tree;

sending, by the routing bridge, a connectivity detection reply packet to the source node when the routing bridge is one node of the at least one target node;

when the routing bridge is not one of the at least one target node, determining, by the routing bridge, whether the routing bridge is on a first path that is based on the nickname of a source node, the nickname of a multicast distribution tree, and the nickname of at least one target node, and wherein the first path is in the multicast distribution tree and starts with the source node and ends at one of the at least one target nodes; and performing, by the routing bridge, processing according to the hop count value and the determination.

2. The method according to claim 1, further comprising:
when the routing bridge is one of the at least one target node:
if the hop count value is greater than a threshold, determining, by the routing bridge, whether the routing bridge is on a second path, wherein the second path is in the multicast distribution tree and starts at the source node and ends at one of the at least one target node that is different from the routing bridge;
subtracting, by the routing bridge, the hop count by 1; and
when the routing bridge is on the second path, forwarding, by the routing bridge, the connectivity detection request packet comprising a subtracted hop count to a next hop node corresponding to a target node on the second path.

3. The method according to claim 2, wherein the threshold is a threshold at which the hop count value changes from a valid value to an invalid value and the threshold is 1.

4. The method according to claim 1, wherein the performing step further comprises:
when the routing bridge is not one of the at least one target node and when the hop count value is equal to the threshold:
sending, by the routing bridge, an unreachable notification to the source node according to the nickname of the source node; and discarding the connectivity detection request packet.

5. The method according to claim 1, wherein after receiving connectivity detection request information, further comprising:
if the hop count is greater than a threshold, subtracting, by the routing bridge, the hop count by 1, and forwarding the connection detection request packet comprising a subtracted hop count along the multicast distribution tree.

6. The method according to claim 1, wherein the performing step further comprises:
when the routing bridge is not one of the at least one target node, the hop count is equal to a threshold and the routing bridge is on the first path:
sending, by the routing bridge, an unreachable notification to the source node according to the nickname of the source node.

7. The method according to a claim 1, further comprising:
when the routing bridge is one of the at least one target node, and the hop count value equals a threshold:
discarding the connectivity detection request packet.

8. The method according to a claim 1, wherein the performing step further comprises:

when the routing bridge is not one of the at least one target node, the hop count value is greater than a threshold and the routing bridge is on the first path:
subtracting, by the routing bridge, the hop count by 1; and
forwarding the connectivity detection request information comprising a subtracted hop count to a next hop node corresponding to a target node on the first path.

9. The method according to claim 1, wherein the performing step further comprises:
when the routing bridge is not one of the at least one target node, the hop count is equal to a threshold, and the routing bridge is not on the first path:
ignoring the connectivity detection request.

10. A routing bridge device, the routing bridge device comprising:
a network interface;
a memory configured to store instructions; and
a processor coupled to the memory;
the network interface configured to receive a connectivity detection request packet comprising at least: a nickname of a source node, a nickname of a multicast distribution tree, a nickname of at least one target node, and a hop count value, wherein the routing bridge device is a non-source node that is in the multicast distribution tree;
send a connectivity detection reply packet to the source node when the routing bridge is one node of the at least one target node;
the processor configured to execute the instructions stored in the memory to:
when the routing bridge is not one of the at least one target node, determine whether the routing bridge is on a first path that is based on the nickname of a source node, the nickname of a multicast distribution tree, and the nickname of at least one target node, and wherein the first path is in the tree and starts with the source node and ends at one of the at least one target nodes; and
perform processing according to the hop count value and the determination.

11. The routing bridge device according to claim 10, wherein the instructions when executed cause the processor to:
when the routing bridge device is one of the at least one target node:
if the hop count value is greater than a threshold, determine whether the routing bridge device is on a second path, wherein the second path is in the multicast distribution tree and starts at the source node and ends at one of the target nodes that is different from the routing bridge;
subtract the hop count by 1, and
when the routing bridge is on the second path, forward the connectivity detection request packet comprising a subtracted hop count to a next hop node corresponding to a target node on the second path.

12. The routing bridge device according to a claim 11, wherein the threshold is a threshold at which the hop count value changes from a valid value to an invalid value and the threshold is 1.

13. The routing bridge device according to claim 10, wherein the instructions when executed cause the processor to:
when the routing bridge device is not one of the target nodes and when the hop count value is equal to the threshold:

send an unreachable notification to the source node according to the nickname of the source node, and discard the connectivity detection request.

14. The routing bridge device according to claim 10, wherein the instructions when executed cause the processor to:
   if the hop count is greater than a threshold,
      subtract the hop count by 1, and forward the connection detection request packet comprising a subtracted hop count along the multicast distribution tree.

15. The routing bridge device according to claim 10, wherein the instructions when executed cause the processor to:
   when the routing bridge is not one of the at least one target nodes, the hop count is equal to a threshold and the routing bridge is on the first path:
      send an unreachable notification to the source node according to the nickname of the source node.

16. The routing bridge device according to claim 10, wherein the instructions when executed cause the processor to:
   when the routing bridge is one of the at least one target node and the hop count value equals to a threshold:
      discard the connectivity detection request packet.

17. The routing bridge device according to claim 10, wherein the instructions when executed cause the processor to:
   when the routing bridge is not one of the at least one target node, the hop count value is greater than a threshold and the routing bridge is on the first path:
      subtract the hop count by 1; and
      forward the connectivity detection request information comprising a subtracted hop count to a next hop node corresponding to a target node on the first path.

18. The routing bridge device according to claim 10, wherein the instructions when executed cause the processor to:
   when the routing bridge is not one of the at least one target node, the hop count is equal to a threshold and the routing bridge is not on the first path:
      ignore the connectivity detection request.

* * * * *